(12) United States Patent
Danko et al.

(10) Patent No.: US 10,808,534 B2
(45) Date of Patent: Oct. 20, 2020

(54) RECONFIGURABLE MAINTENANCE APPARATUS

(71) Applicant: GENERAL ELECTRIC COMPANY, Schenectady, NY (US)

(72) Inventors: Todd William Danko, Niskayuna, NY (US); Mark John Zajkowski, Austerlitz, NY (US); Don Mark Lipkin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 422 days.

(21) Appl. No.: 15/427,264

(22) Filed: Feb. 8, 2017

(65) Prior Publication Data

US 2018/0223667 A1 Aug. 9, 2018

(51) Int. Cl.
*F04D 29/32* (2006.01)
*F01D 5/00* (2006.01)
*B23P 6/00* (2006.01)
*G02B 23/24* (2006.01)

(52) U.S. Cl.
CPC .............. *F01D 5/005* (2013.01); *B23P 6/002* (2013.01); *F04D 29/324* (2013.01); *F05D 2230/72* (2013.01); *F05D 2230/80* (2013.01); *G02B 23/2476* (2013.01)

(58) Field of Classification Search
CPC ....... F01D 5/005; G01N 21/954; B23P 6/002; F04D 29/324; G02B 23/2476; F05D 2230/80; F05D 2230/72; Y10T 29/49321
See application file for complete search history.

(56) References Cited

U.S. PATENT DOCUMENTS

| | | | |
|---|---|---|---|
| 6,792,809 B1 | 9/2004 | Moore | |
| 6,917,176 B2 | 7/2005 | Schempf et al. | |
| 7,730,756 B2 | 6/2010 | Gosling et al. | |
| 8,400,501 B2 | 3/2013 | Heyworth et al. | |
| 9,145,213 B2 | 9/2015 | Myer et al. | |
| 9,218,470 B2 | 12/2015 | Domke et al. | |
| 9,322,332 B2 * | 4/2016 | Kell | F02C 7/00 |
| 9,394,829 B2 | 7/2016 | Cabeen et al. | |
| 2014/0290208 A1 | 10/2014 | Rechain et al. | |
| 2015/0174837 A1 | 6/2015 | Kolvick et al. | |
| 2015/0174838 A1 | 6/2015 | Kittleson et al. | |

(Continued)

OTHER PUBLICATIONS

Hartmann et al., "Inspection, Maintenance and Field Repair of Heavy Duty Industrial Gas Turbines", International Gas Turbine Conference and Products Show, vol. 1B, pp. V01BT02A064, http://proceedings.asmedigitalcollection.asme.org/proceeding.aspx?articleid=2278758&resultClick=3, Mar. 30-Apr. 4, 1974.

(Continued)

*Primary Examiner* — Sarang Afzali
*Assistant Examiner* — Ruth G Hidalgo-Hernandez
(74) *Attorney, Agent, or Firm* — Armstrong Teasdale LLP

(57) ABSTRACT

A reconfigurable maintenance apparatus includes a body configured to operate within a cavity. The body has a first shape in a first configuration and a second shape in a second configuration. The first configuration facilitates the body entering the cavity. The reconfigurable apparatus also includes at least one maintenance device operably coupled to the body. The second configuration facilitates the at least one maintenance device of the reconfigurable apparatus performing a maintenance operation.

24 Claims, 4 Drawing Sheets

(56) References Cited

U.S. PATENT DOCUMENTS

2015/0175486 A1 6/2015 Roberts et al.
2015/0300920 A1* 10/2015 DeAscanis ............ G01M 15/14
356/614

OTHER PUBLICATIONS

Keyes et al., "High Temperature Telemetry Systems for in Situ Monitoring of Gas Turbine Engine Components", 2009 IEEE Aerospace conference, pp. 1-15, Mar. 7-14, 2009.
Nozari et al., "Model-based Robust Fault Detection and Isolation of an Industrial Gas Turbine Prototype Using Soft Computing Techniques", Neurocomputing, vol. 91, pp. 29-47, Aug. 15, 2012.
Addabbo et al., "Gas Turbine Sensor Loop Availability Driven Fall Back Strategies Design", 2015 IEEE International Instrumentation and Measurement Technology Conference (I2MTC) Proceedings, pp. 641-645, May 11-14, 2015.

\* cited by examiner

RECONFIGURABLE MAINTENANCE APPARATUS

BACKGROUND

The field of the disclosure relates generally to maintenance apparatus and, more particularly, to maintenance apparatus that are reconfigurable and operate within cavities.

At least some known components that require periodic maintenance are located within cavities. For example, at least some known rotary machines, such as turbines for aircraft engines and gas and steam powered turbines for power generation and industrial applications, include an outer case and at least one rotor that carries multiple stages of rotating airfoils, i.e., blades, which rotate with respect to the outer case. In addition, the outer case carries multiple stages of stationary airfoils, i.e., guide vanes. The blades and guide vanes are arranged in alternating stages. In at least some known turbines, shrouds are disposed on the radially inner surfaces of a stator to form a ring seal around tips of the blades. Together, the blades, guide vanes, and shrouds define a primary flowpath inside the compressor and turbine sections of the turbine. This flowpath, combined with a flowpath through the combustor, defines a primary cavity within the turbine.

During operation, the components of the rotary machine experience degradation. Accordingly, for at least some known rotary machines, periodic inspections, such as borescope inspections, are performed to assess the condition of the rotary machine in-between service intervals. For turbines, examples of damage observed during inspections include wear (e.g., from incursion of blade tips into the shrouds, particle-induced erosion, water droplet induced erosion, wear due to sliding contact between stationary components), impact (e.g., spallation of thermal barrier coating (TBC) or environmental barrier coating (EBC) from turbine-section components, leading edge burring/bending of compressor blades), cracking (e.g., thermal fatigue, low-cycle fatigue, high-cycle fatigue, creep rupture), edge-of-contact damage between stationary parts, oxidation or hot corrosion of high-temperature metallic sections, static seal degradation, and creep deformation (e.g., of guide vane sidewalls/airfoils, blade platforms, and blade tip shrouds).

During service intervals, the rotary machines are at least partially disassembled to allow repair and/or replacement of damaged components. For example, damaged components of at least some known turbines are primarily repaired at overhaul or component repair facilities, with only limited intervention conducted in the field. Processes used to repair compressor and turbine flowpath components include surface cleaning to remove accumulated dirt and oxidation products, stripping and restoration of coated surfaces, crack repair, section replacement, and aero contouring and smoothing. Repairing the components during service intervals reduces the cost to maintain the rotary machine because the cost to repair components is sometimes less than the cost to replace the components. However, sometimes, the components run past their repair limits between planned service intervals. In addition, heavily distressed components can fail during service and can cause an unplanned outage.

For at least some known rotary machines, a tethered device, such as a borescope, is inserted through an opening of the rotary machine and manipulated within a cavity of the rotary machine for inspection. However, at least some known tethered devices do not access all locations of the rotary machine. In particular, some non-rotating components in at least some known rotary machine are difficult to access with a tethered device. Furthermore, damage detected during inspection is typically unmitigated until the machine is at least partially disassembled during service.

BRIEF DESCRIPTION

In one aspect, a reconfigurable maintenance apparatus is provided. The reconfigurable maintenance apparatus includes a body configured to operate within a cavity. The body has a first shape in a first configuration and a second shape in a second configuration. The first configuration facilitates the body entering the cavity. The reconfigurable apparatus also includes at least one maintenance device operably coupled to the body. The second configuration facilitates the at least one maintenance device of the reconfigurable apparatus performing a maintenance operation.

In another aspect, a maintenance system is provided. The maintenance system includes a reconfigurable apparatus and a controller positioned remotely from the reconfigurable apparatus. The reconfigurable maintenance apparatus includes a body configured to operate within a cavity. The body has a first shape in a first configuration and a second shape in a second configuration. The first configuration facilitates the body entering the cavity. The reconfigurable apparatus also includes at least one maintenance device operably coupled to the body. The second configuration facilitates the at least one maintenance device of the reconfigurable apparatus performing a maintenance operation.

In a further aspect, a method of operating a reconfigurable maintenance apparatus is provided. The method includes providing the reconfigurable apparatus configured to operate within a cavity. The reconfigurable maintenance apparatus includes a body having a first configuration and a second configuration. The method also includes moving the body into the cavity while the body is in the first configuration. The body further has a first shape in the first configuration. The first configuration facilitates the body entering the cavity. The method further includes changing the body between the first configuration and the second configuration while the body is within the cavity. The method also includes operating at least one maintenance device coupled to the body while the body is in the second configuration. The body has a second shape in the second configuration.

DRAWINGS

These and other features, aspects, and advantages of the present disclosure will become better understood when the following detailed description is read with reference to the accompanying drawings in which like characters represent like parts throughout the drawings, wherein.

Figure 1:
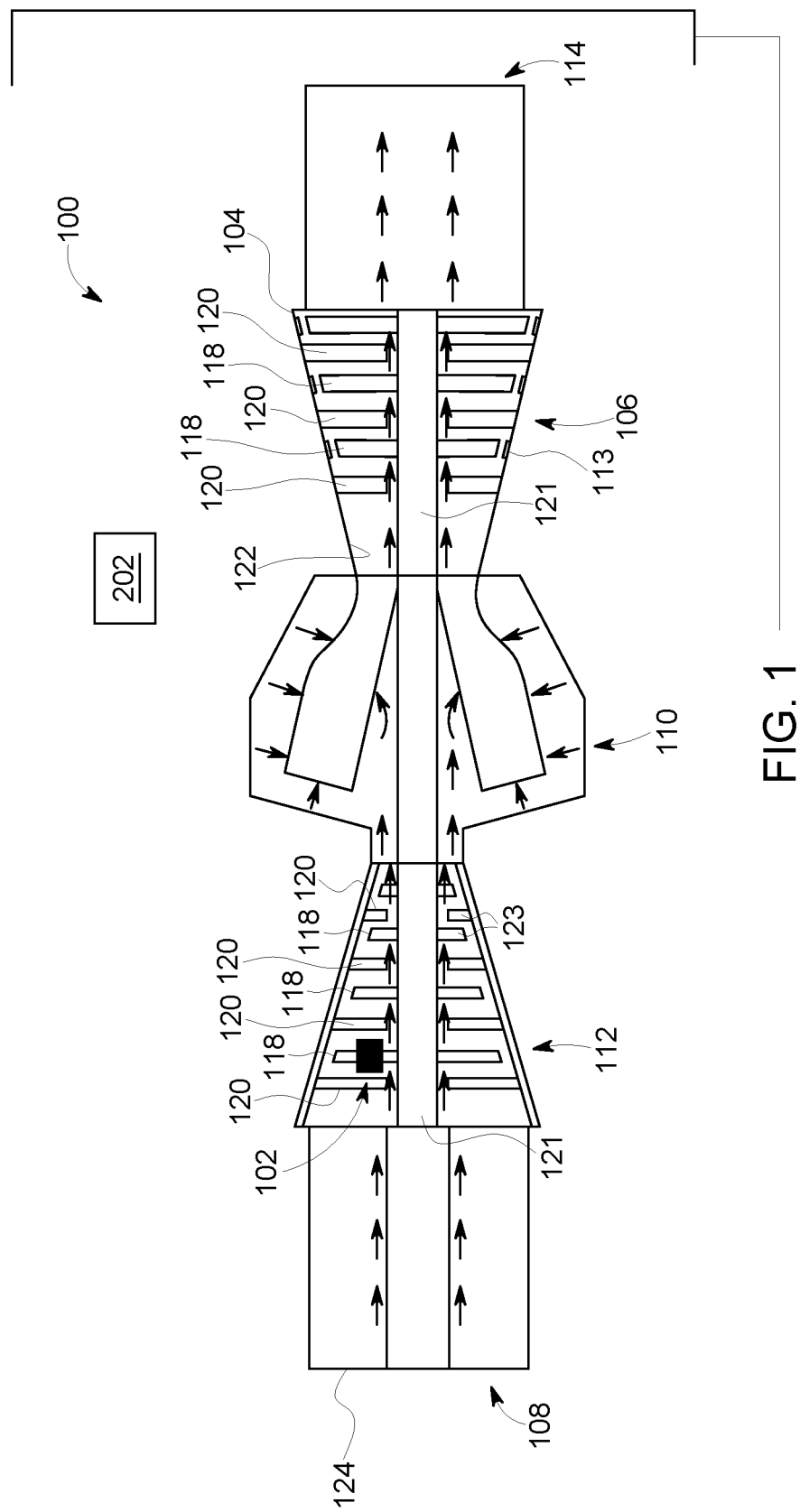
FIG. 1 is a cross-sectional schematic view of an exemplary rotary machine in the form of a land-based turbine and an exemplary reconfigurable apparatus.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "vessel" refers to an apparatus including a cavity.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. For example, in some embodiments, the term "controller" may refer to a power regulator. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein provide reconfigurable apparatus for performing maintenance operations within cavities. As used herein, the terms "maintain" and "maintenance" include any inspection and repair operations that facilitate continued operation of an assembly. The reconfigurable apparatus is configured to fit within and move through a cavity. The reconfigurable apparatus includes at least one maintenance device that facilitates repairing and/or inspecting the components within the cavity. In addition, the reconfigurable apparatus changes between a first configuration and a second configuration. The first configuration facilitates the reconfigurable apparatus moving through an opening and into the cavity. The second configuration facilitates operation of the at least one maintenance device. As a result, the reconfigurable apparatus enables maintenance operations within a cavity, and particularly of difficult to access locations within the cavity, to be performed in situ.

FIG. 1 is a cross-sectional schematic view of an exemplary rotary machine and a reconfigurable apparatus 102. In the exemplary embodiment, the rotary machine includes a turbine assembly 100. In alternative embodiments, reconfigurable apparatus 102 is used to perform maintenance on any component within a cavity. For example, in some embodiments, reconfigurable apparatus 102 performs maintenance on, without limitation, any of the following: rotating machinery (e.g., a compressor, a blower, a pump, a turbine, a motor, and a generator), storage tanks, heat exchangers, boilers, and pipes.

In the exemplary embodiment, turbine assembly 100 includes an outer case 104, a turbine 106, an inlet 108, a combustor 110, a compressor 112, and an exhaust 114. Fluid flows from inlet 108, through compressor 112, through combustor 110, through turbine 106 and is discharged through exhaust 114. Together, outer case 104, blades 118, guide vanes 120, and shrouds 113 define a primary flowpath inside compressor 112 and turbine 106 of turbine assembly 100. This flowpath, combined with a flowpath through combustor 110, defines a primary cavity within turbine assembly 100. In alternative embodiments, turbine assembly 100 is configured in any manner that enables turbine assembly 100 to operate as described herein.

Also, in the exemplary embodiment, compressor 112 and turbine 106 include airfoils configured to direct fluid through turbine assembly 100. In particular, compressor 112 and turbine 106 include blades 118 and guide vanes 120. Blades 118 are operably coupled with rotating shaft 121 such that blades 118 rotate when rotating shaft 121 rotates. Guide vanes 120 and shrouds 113 are stationary components and are coupled to an inner surface 122 of outer case 104. Blades 118 and guide vanes 120 generally are positioned alternatingly along the rotor axis within turbine assembly 100. In alternative embodiments, compressor 112 and/or turbine 106 includes any airfoils that enable turbine assembly 100 to operate as described herein.

In addition, in the exemplary embodiment, reconfigurable apparatus 102 is configured to move through turbine assembly 100 within the primary cavity. Accordingly, reconfigurable apparatus 102 facilitates maintenance of turbine assembly 100. For example, reconfigurable apparatus 102 facilitates maintenance of turbine assembly 100 at locations that are difficult to access from an exterior of turbine assembly 100, such as the primary cavity of turbine assembly 100. Moreover, reconfigurable apparatus 102 changes shape to facilitate reconfigurable apparatus 102 accessing the primary cavity of the turbine assembly 100, moving within turbine assembly 100 and maintaining turbine assembly 100.

During operation, reconfigurable apparatus 102 is used to maintain any interior components of turbine assembly 100. For example, in some embodiments, reconfigurable apparatus 102 is positioned adjacent an interior surface 123 of turbine assembly 100. Interior surface 123 is any surface within the primary cavity of turbine assembly 100. For example, in some embodiments interior surface 123 includes, without limitation, surfaces of blades 118, guide vanes 120, shrouds 113, outer case 104, and combustor 110. In some embodiments, reconfigurable apparatus 102 detects a characteristic of interior surface 123. For example, in some embodiments, reconfigurable apparatus 102 is used to generate an image of interior surface 123 and the image is examined to determine whether repairs are necessary. If repairs are necessary, in some embodiments, reconfigurable apparatus 102 may include the means to repair interior surface 123. For example, in some embodiments, reconfigurable apparatus 102 cleans, machines, sprays and/or patches a damaged portion of interior surface 123. After maintenance of turbine assembly 100, reconfigurable apparatus 102 exits turbine assembly 100 through any suitable access port or opening of turbine assembly 100.

Figure 2:
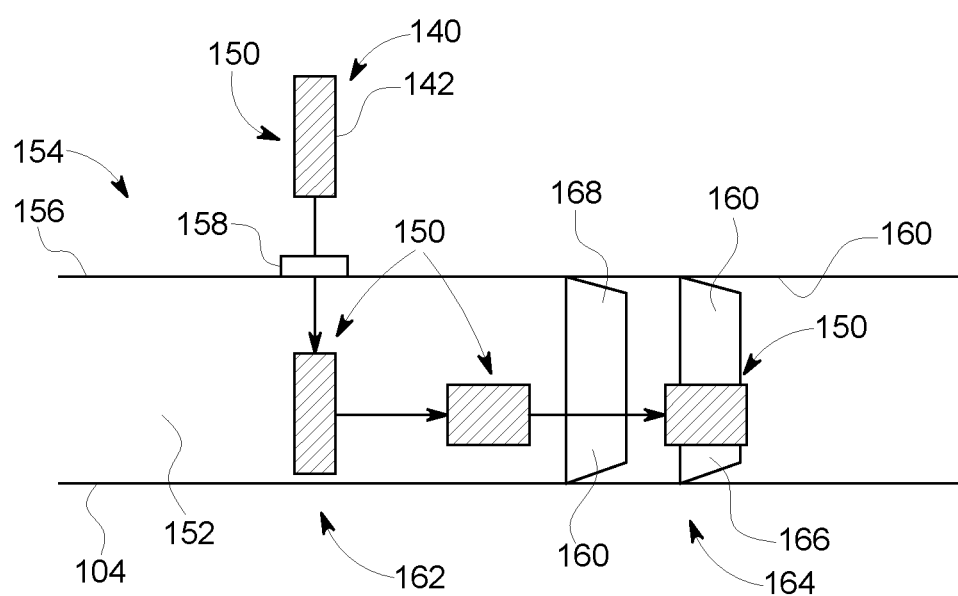
FIG. 2 is a schematic view of an alternative embodiment of a reconfigurable apparatus changing shape within a cavity.

FIG. 2 is a schematic view of an exemplary reconfigurable apparatus 150 changing shape upon entering a cavity 152. Reconfigurable apparatus 150 changes shape to facilitate reconfigurable apparatus 150 entering cavity 152, moving through cavity 152, performing maintenance operations inside cavity 152, and exiting cavity 152. For example, in the exemplary embodiment, reconfigurable apparatus 150 has a first shape or configuration when reconfigurable apparatus 150 moves from an exterior of a housing 156 into cavity 152. Reconfigurable apparatus 150 enters cavity 152 through an access port 158, such as an igniter, borescope, or fuel nozzle port of an aircraft engine 154. In particular, reconfigurable apparatus 150 has an elongate shape as reconfigurable apparatus 150 moves through access port 158. As used herein, the term "prolate" refers to a shape that is elongated along one axis and foreshortened along two axes. For example, prolate generally includes spheroidal, cylindrical, ellipsoidal, and prismatic shapes in which one axis is elongated relative to the other two. After entering cavity 152, reconfigurable apparatus 150 changes to a second shape or configuration that facilitates reconfigurable apparatus 150 moving through cavity 152 to a target location and performing an maintenance operation on an interior surface 160 of aircraft engine 154. In particular, reconfigurable apparatus 150 has an oblate shape as reconfigurable apparatus 150 moves through cavity 152 and/or performs a maintenance operation. As used herein, the term "oblate" refers to a shape that is foreshortened along one axis and elongated along two axes. For example, oblate generally includes spheroidal, lenticular, cambered, and rectangular prism shapes in which one axis is shortened relative to the other two. As shown in FIG. 2, the second shape of reconfigurable apparatus 150 is different from the first shape of reconfigurable apparatus 150. In alternative embodiments, reconfigurable apparatus 150 has any shape that enables reconfigurable apparatus 150 to operate as described herein. For example, in some embodiments, reconfigurable apparatus 150 changes to a third or intermediate shape for traveling through at least a portion of cavity 152.

Also, in the exemplary embodiment, reconfigurable apparatus 150 includes a body 140 including a sidewall 142. Sidewall 142 is flexible to facilitate reconfigurable apparatus 150 changing shape. In some embodiments, sidewall 142 includes a plurality of segments to facilitate reconfigurable apparatus 150 changing shape. In particular, in the exemplary embodiment, sidewall 142 changes from a generally prolate shape to a generally oblate shape. In alternative embodiments, reconfigurable apparatus 150 includes any body 140 that enables reconfigurable apparatus 150 to operate as described herein. For example, in some embodiments, sidewall 142 includes a pliable membrane that allows reconfigurable apparatus 150 to conform to multiple shapes. In further embodiments, sidewall 142 includes segments that are positionable relative to each other, as with hinges or magnetic pivots. In some embodiments, sidewall 142 is at least partially elastic.

Moreover, in the exemplary embodiment, reconfigurable apparatus 150 enters a combustor 162 of aircraft engine 154 through access port 158 and moves toward a high pressure turbine 164 of aircraft engine 154. The first shape facilitates reconfigurable apparatus 150 entering access port 158. For example, in some embodiments, access port 158 is circular and the first shape is prolate to facilitate reconfigurable apparatus 150 fitting through access port 158. The second shape of reconfigurable apparatus 150 facilitates reconfigurable apparatus 150 moving through portions of aircraft engine 154, such as through the high pressure turbine 164. For example, the second shape allows reconfigurable apparatus 150 to fit/move between blades 166 and/or guide vanes 168 of high pressure turbine 164 and facilitates reconfigurable apparatus 150 performing one or more maintenance operations on interior surface 160 of aircraft engine 154.

In the exemplary embodiment, reconfigurable apparatus 150 is positioned within cavity 152 using a positioning device (not shown). In some embodiments, the positioning device holds reconfigurable apparatus 150 and extends into a cavity 152. The positioning device is controlled by an operator. In alternative embodiments, reconfigurable apparatus 150 moves through cavity 152 in any manner that enables reconfigurable apparatus 150 to operate as described herein. For example, in some embodiments, reconfigurable apparatus 150 includes a drive system that at least partially propels reconfigurable apparatus through cavity 152. In some embodiments, reconfigurable apparatus 150 is at least partially propelled through cavity 152 by the act of changing shapes. For example, in some embodiments, reconfigurable apparatus 150 performs a creeping and/or crawling action as reconfigurable apparatus 150 changes shape. In further embodiments, reconfigurable apparatus 150 performs a perching and/or prehensile grasping action when reconfigurable apparatus 150 changes shape.

Figure 3:
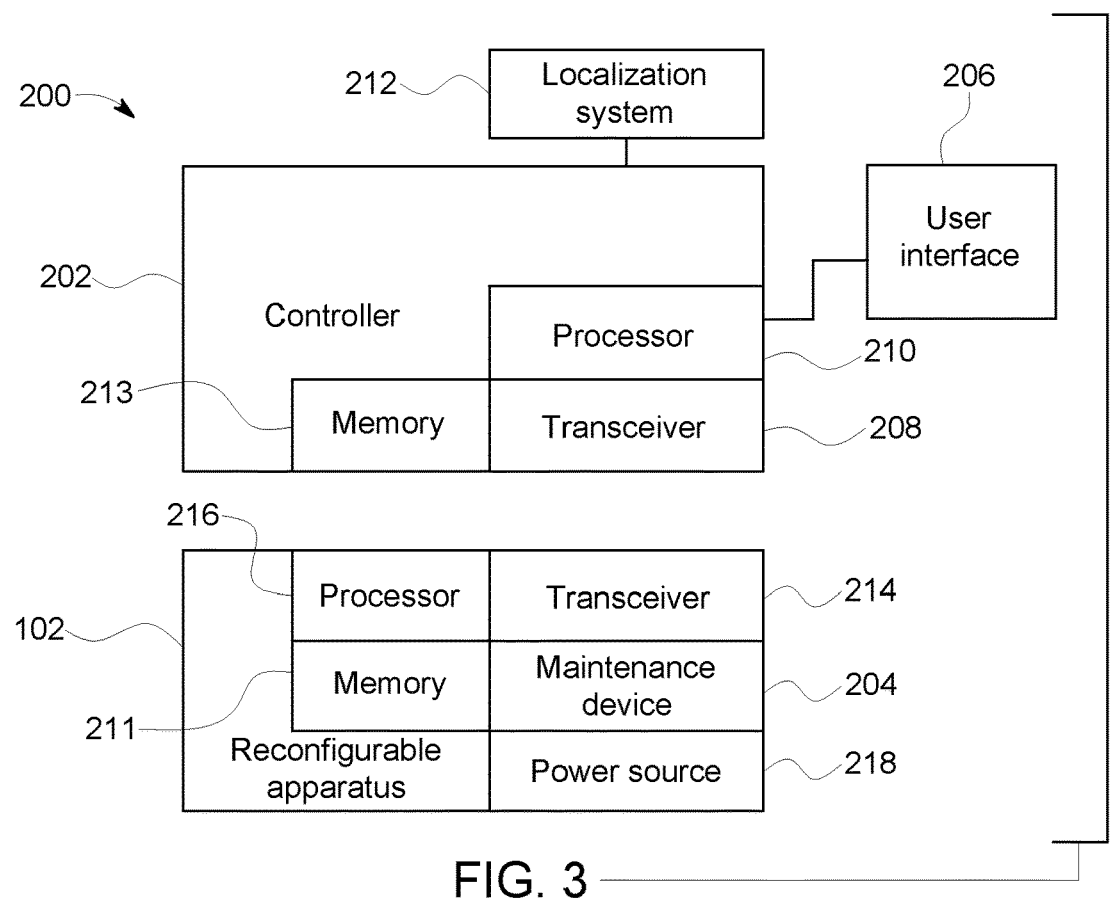
FIG. 3 is a schematic view of an exemplary system for use in maintaining the apparatus shown in FIG. 1 and FIG. 2.

FIG. 3 is a schematic view of an exemplary system 200 for use in maintaining turbine assembly 100 (shown in FIG. 1) and aircraft engine 154 (shown in FIG. 2). System 200 includes reconfigurable apparatus 102, a controller 202, a maintenance device 204, a user interface 206, and a localization system 212. In alternative embodiments, system 200 includes any component that enables system 200 to operate as described herein. In further embodiments, user interface 206 is omitted.

In the exemplary embodiment, controller 202 includes a transceiver 208, and a processor 210. Transceiver 208 is configured to send and/or receive information or data. Transceiver 208 is communicatively coupled with a transceiver 214 of reconfigurable apparatus 102. In the exemplary embodiment, transceiver 208 and transceiver 214 each include wireless transceivers to allow reconfigurable apparatus 102 and controller 202 to communicate wirelessly, such as via radiofrequency (e.g., analog, WIFI CERTIFIED local area networks, BLUETOOTH wireless technology) and/or light (e.g., light fidelity networks) communication protocols. In alternative embodiments, reconfigurable apparatus 102 and controller 202 communicate in any manner that enables system 200 to operate as described herein. For example, in some embodiments, controller 202 and reconfigurable apparatus 102 exchange information through a line (e.g., a harness, a tether, a wire, a cable, a conductive trace) extending between reconfigurable apparatus 102 and controller 202.

Also in the exemplary embodiment, controller 202 is positioned remotely from reconfigurable apparatus 102. In particular, controller 202 is positioned on the exterior of turbine assembly 100 (shown in FIG. 1) or aircraft engine 154 (shown in FIG. 2). In alternative embodiments, controller 202 is positioned anywhere that enables system 200 to operate as described herein. For example, in some embodiments, controller 202 is positioned at least partially within the primary cavity, such as within the exhaust, inlet plenum, or combustion cavity.

In some embodiments, maintenance device 204 includes one or more sensors and/or repair tools. For example, in the exemplary embodiment, maintenance device 204 is configured to detect a characteristic of turbine assembly 100 (shown in FIG. 1), aircraft engine 154 (shown in FIG. 2), and/or reconfigurable apparatus 102 and generate data relating to the characteristic. Transceiver 208 is in communication with maintenance device 204 via transceiver 214 and is configured to receive data or information relating to the characteristic detected by maintenance device 204. In alternative embodiments, system 200 includes any maintenance device 204 that enables system 200 to operate as described herein. For example, in some embodiments, system 200 includes, without limitation, any of the following: an applicator, a spray nozzle, a drill, a grinder, a heater, a visual sensor, a mechanical sensor, a temperature sensor, a magnetic sensor, an infrared sensor, an acoustic sensor, and an eddy current sensor.

In addition, in the exemplary embodiment, reconfigurable apparatus 102 includes a processor 216. Processor 216 is configured to execute instructions for controlling one or more components of reconfigurable apparatus 102, such as maintenance device 204. In alternative embodiments, reconfigurable apparatus 102 includes any processor 216 that enables system 200 to operate as described herein. In some embodiments, processor 216 is omitted.

Also, in the exemplary embodiment, user interface 206 is configured to record and/or display data relating to the characteristic detected by maintenance device 204 for interpretation by the user. For example, in some embodiments, user interface 206 displays images of interior surface 123 (shown in FIG. 1) of turbine assembly 100 or interior surface 160 of aircraft engine 154 (shown in FIG. 2). In some embodiments, user interface 206 allows a user to input and/or view information relating to control of reconfigurable apparatus 102. In an exemplary embodiment, user interface 206 is configured to display information relating to the state of one or more of maintenance device 204 and power source 218 for interpretation by the user. For example, state information may include the position of maintenance device 204 relative to a body of reconfigurable apparatus 102. State information may also include charge status of power source 218 and/or current draw on the various drive and positioning motors. Controller 202 translates the user inputs into steering, tool motion, camera control, sensor control, sensor motion, and/or any other commands and sends control commands to reconfigurable apparatus 102 via transceiver 214 or via a tether. In some embodiments, control commands include, without limitation, one or more of sensor control, image data pull, illumination control, and motor control. Examples of motor control include drive, steering, sensor positioning, repair tool positioning, and repair tool operation. In some embodiments, user control of reconfigurable apparatus 102 is in real-time, such as through a joystick, keyboard, touchscreen, and/or other interface having similar function. In other embodiments, reconfigurable apparatus 102 is controlled partially or wholly according to a pre-programmed routine. In some embodiments, a user inputs information, such as operation goals or conditional directions, and reconfigurable apparatus 102 is at least partially automated. In further embodiments, information, such as information received by controller 202 from reconfigurable apparatus 102, control data sent to reconfigurable apparatus 102, and additional user inputs or state information (e.g., location, time, orientation, datalink quality, battery levels, repair material levels, failure mode indicators), is logged into memory 211 on-board reconfigurable apparatus 102 and/or memory 213 on controller 202.

In reference to FIGS. 1, 2 and 3, in the exemplary embodiment, controller 202 is positioned on the exterior of turbine assembly 100 or aircraft engine 154 and communicates with reconfigurable apparatus 102 positioned within the primary cavity. For example, controller 202 is configured to send information to reconfigurable apparatus 102 relating to the propulsion and/or steering of reconfigurable apparatus 102 while reconfigurable apparatus 102 is moving within the primary cavity of turbine assembly 100. In alternative embodiments, controller 202 and reconfigurable apparatus 102 are configured in any manner that enables system 200 to operate as described herein. For example, in some embodiments, controller 202 and/or user interface 206 may be positioned in or adjacent inlet 108, exhaust 114, or combustor 110 of turbine assembly 100.

In some embodiments, reconfigurable apparatus 102 is positioned and moved in any manner that enables reconfigurable apparatus 102 to operate as described herein. For example, in some embodiments, a component (not shown), such as a tether, extends from reconfigurable apparatus 102 to the exterior of turbine assembly 100 for an operator to control reconfigurable apparatus 102 and move reconfigurable apparatus 102 within the primary cavity. In further embodiments, reconfigurable apparatus 102 is moved within the primary cavity by a component, such as a magnet, located on an exterior of turbine assembly 100. In some embodiments, reconfigurable apparatus 102 includes a propulsion system to move reconfigurable apparatus 102 without exterior forces acting on reconfigurable apparatus 102.

In addition, in the exemplary embodiment, localization system 212 determines a position of reconfigurable apparatus 102 relative to turbine assembly 100 based on information received from reconfigurable apparatus 102. In some embodiments, localization system 212 determines a position of maintenance device 204 and/or a body of reconfigurable apparatus 102 relative to interior surface 123 of turbine assembly 100 or interior surface 160 of aircraft engine 154. In some embodiments, localization system 212 indirectly detects a position of reconfigurable apparatus 102 based on characteristics detected by maintenance device 204 and/or additional sensors, such as proximity sensors, located on reconfigurable apparatus 102. For example, in some embodiments, maintenance device 204 includes a camera and localization system 212 determines a position of reconfigurable apparatus 102 based on an image of a portion of turbine assembly 100 or aircraft engine 154 visible to reconfigurable apparatus 102, such as by comparing image data to a model of turbine assembly 100 or aircraft engine 154. In alternative embodiments, localization system 212 determines a position of reconfigurable apparatus 102 in any manner that enables reconfigurable apparatus 102 to operate as described herein. For example, in some embodiments, localization system 212 utilizes pre-existing or purposefully placed landmarks within turbine assembly 100 or aircraft engine 154 to determine a position of reconfigurable apparatus 102. In further embodiments, devices such as borescopes and/or illuminators are positioned through access ports (not shown) in outer case 104 to facilitate localization. In some embodiments, localization system 212 utilizes radiography to facilitate determining a position of reconfigurable apparatus 102.

In some embodiments, localization system 212 may additionally use an inclinometer (not shown), rotational velocity sensor (not shown), and/or magnetometer (not shown) located on reconfigurable apparatus 102 to measure the reconfigurable apparatus's 102 roll, pitch and yaw with regard to the direction of gravity and/or known environmental magnetic field orientations. Comparing measurements of the reconfigurable apparatus's 102 roll, pitch and yaw with a priori knowledge of interior surfaces 123, 160, the localization system can partially or fully recognize the location of reconfigurable apparatus 102 within the cavity.

In some embodiments, localization system 212 is incorporated into controller 202. In alternative embodiments, system 200 includes any localization system 212 that enables system 200 to operate as described herein. For example, in some embodiments, localization system 212 is included entirely within reconfigurable apparatus 102 such that reconfigurable apparatus 102 detects and interprets information relating to a position of reconfigurable apparatus 102. In such embodiments, an external component of localization system 212 is unnecessary. In further embodiments, localization system 212 is distinct from controller 202 and reconfigurable apparatus 102. In some embodiments, the localization system 212 may combine multiple pieces of data from localization system 212 and/or maintenance device 204 to estimate the reconfigurable apparatus's 102 position with regard to interior surfaces, such as interior surface 123 of rotary machine 100 and interior surfaces 160 of aircraft engine 154.

In some embodiments, localization system 212 is at least partially distinct from reconfigurable apparatus 102 and reconfigurable apparatus 102 detects and sends information to those components of localization system 212 that are distinct from reconfigurable apparatus 102. In some such embodiments, localization system 212 at least partially processes the information such that localization system 212 is at least partially automated. In further embodiments, the information is received by a user via user interface 206 and is at least partially interpreted by the user.

In some embodiments, localization system 212 is adjustable between different modes. For example, in some embodiments, localization system 212 operates in an at least partially manual mode and switches to an automated mode when necessary, such as when signal is lost between user interface 206 and reconfigurable apparatus 102.

Figure 4:
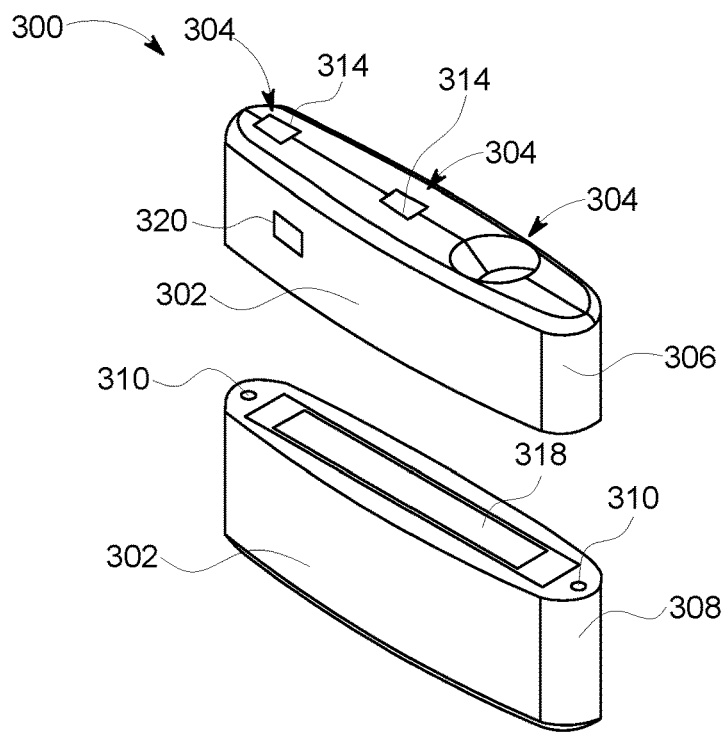
FIG. 4 is a perspective view of an alternative embodiment of a reconfigurable apparatus in a first configuration for use with the rotary machine shown in FIGS. 1 and 2.
Figure 5:
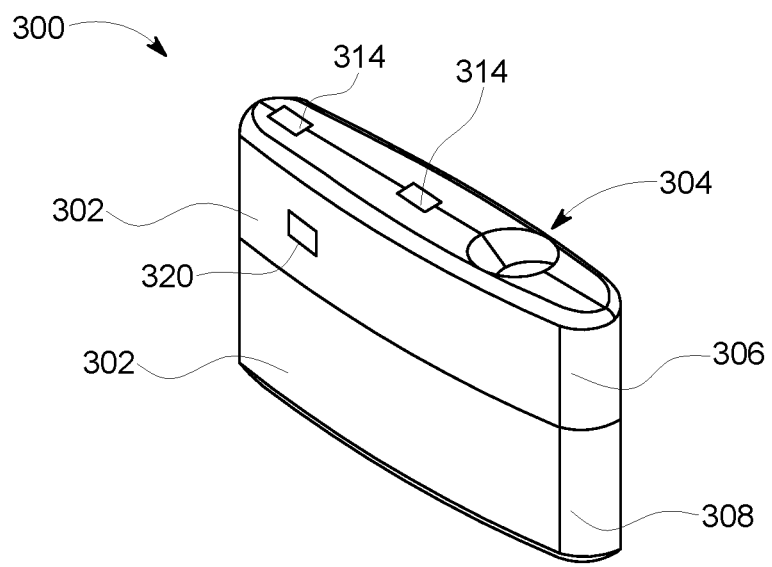
FIG. 5 is a perspective view of the reconfigurable apparatus shown in FIG. 4 in a second configuration.
Figure 6:
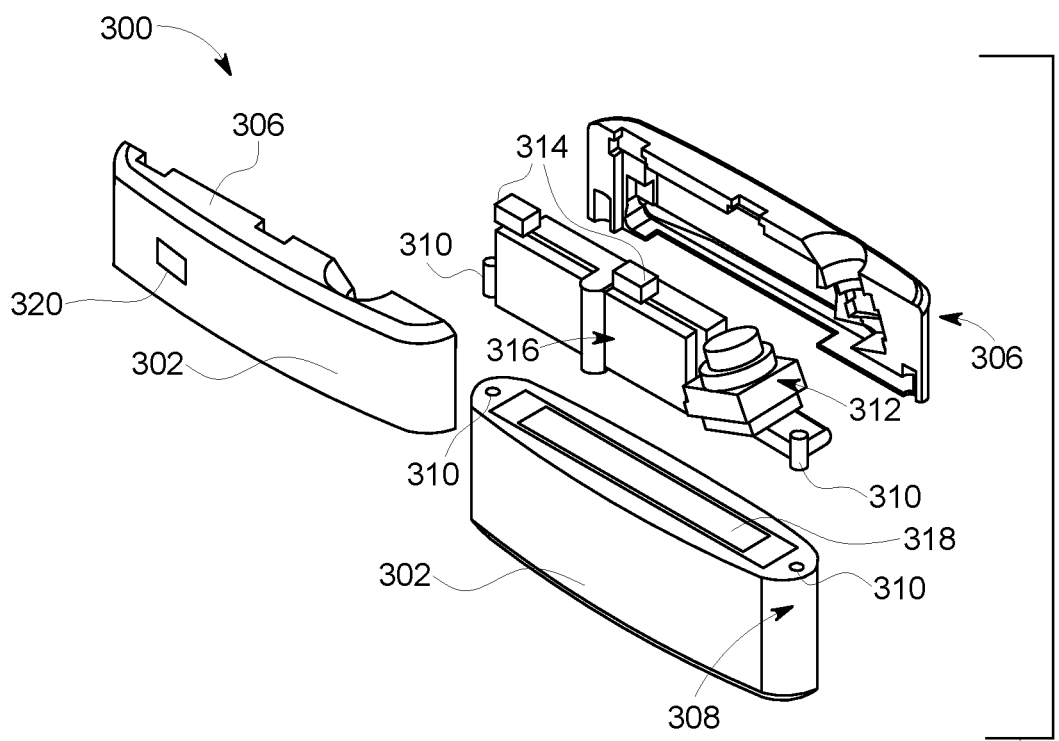
FIG. 6 is an exploded view of the reconfigurable apparatus shown in FIGS. 4 and 5.

FIG. 4 is a perspective view of an alternative embodiment of a reconfigurable apparatus 300 for use with turbine assembly 100 in a first configuration. FIG. 5 is a perspective view of reconfigurable apparatus 300 in a second configuration. FIG. 6 is an exploded view of reconfigurable apparatus 300. Reconfigurable apparatus 300 includes a body 302 and a maintenance device 304. Body 302 includes a first portion 306 and a second portion 308. In some embodiments, in the first configuration, first portion 306 and second portion 308 are positioned end to end. In alternative embodiments, reconfigurable apparatus 300 includes any component that enables reconfigurable apparatus 300 to operate as described herein. For example, in some embodiments, reconfigurable apparatus 300 includes three or more portions.

In the exemplary embodiment, first portion 306 and second portion 308 are configured to selectively couple together. In addition, first portion 306 moves relative to second portion 308 when reconfigurable apparatus 300 changes between the first configuration and the second configuration. In the exemplary embodiment, first portion 306 and second portion 308 are coupled together when reconfigurable apparatus 300 is in the second configuration. Body 302 is reconfigured when reconfigurable apparatus 300 is moved between the first configuration and the second configuration. For example, in some embodiments, first portion 306 and second portion 308 are decoupled when reconfigurable apparatus 300 is in the first configuration. In alternative embodiments, body 302 has any configuration that enables reconfigurable apparatus 300 to operate as described herein. For example, in at least one configuration of body 302, first portion 306 and second portion 308 are physically coupled, e.g., by a component, such as elastic or rotary mechanical hinges, magnetic clamps, flexible line or any suitable means of attachment extending between first portion 306 and second portion 308.

In addition, in the exemplary embodiment, reconfigurable apparatus 300 has a generally prolate segmented shape when reconfigurable apparatus is in the first configuration. When reconfigurable apparatus 300 is in the second configuration, reconfigurable apparatus 300 has a generally oblate shape. As a result, the first configuration facilitates reconfigurable apparatus 300 fitting through openings and/or passages that are too small for the second configuration. In the exemplary embodiment, first portion 306 and second portion 308 move sequentially through the openings and/or passages when reconfigurable apparatus 300 is in the first configuration.

Also, in the exemplary embodiment, body 302 further includes a coupling mechanism 310 that selectively couples first portion 306 and second portion 308 in the second configuration. In particular, coupling mechanism 310 includes magnets mounted on each of first portion 306 and second portion 308. In alternative embodiments, reconfigurable apparatus 102 includes any coupling mechanism 310 that enables reconfigurable apparatus 102 to operate as described herein. For example, in some embodiments, reconfigurable apparatus 102 includes, without limitation, any of the following: a clamp, a screw, a cord, adhesive, a suction port, a hook, an anchor, a fastener, a latch, a catch, a hinge, and any combination thereof. In alternative embodiments, reconfigurable apparatus 102 includes segments with geometrically interlocking features, such as dovetails, to accommodate reconfiguration.

In addition, in the exemplary embodiment, reconfigurable apparatus 300 includes maintenance device 304, a communication component 316 (e.g., an RF transceiver with an antenna), and a power source 318 (e.g., a lithium-polymer battery). Maintenance device 304 includes one or more cameras 312 and one or more illuminators 314, such as a light-emitting diodes (LED). Maintenance device 304 is configured to generate images of the interior surfaces of a cavity, such as the interior of turbine assembly 100 (shown in FIG. 1) or aircraft engine 154 (shown in FIG. 2). In alternative embodiments, reconfigurable apparatus 300 includes any maintenance device 304 that enables reconfigurable apparatus 300 to operate as described herein. For example, in some embodiments, reconfigurable apparatus 300 includes, without limitation a repair tool (e.g., an applicator, a sprayer, a drill) or an inspection sensor (e.g., an optical sensor, a thermal sensor, an acoustic sensor, a mechanical sensor, an eddy current sensor, and a magnetic sensor). In further embodiments, maintenance device 304 is movable relative to body 302. In some embodiments, reconfigurable apparatus 300 includes a plurality of maintenance devices 304.

Also, in the exemplary embodiment, power source 318 is included within second portion 308. Camera 312, illuminator 314, and communication component 316 are included within first portion 306. Power source 318 is coupled to and provides power to camera 312, illuminator 314, and communication component 316 when first portion 306 is coupled to second portion 308. For example, this may be accomplished by closing the electrical circuit to the power source 318 when first portion 306 is coupled to second portion 308. Accordingly, maintenance device 304 is operational when reconfigurable apparatus 300 is in the second configuration. In particular, in the exemplary embodiment, the second configuration facilitates reconfigurable apparatus 300 generating images of the interior surfaces of the cavity, such as interior surfaces 123 of turbine assembly 100 (shown in FIG. 1) and interior surfaces 160 of aircraft engine 154 (shown in FIG. 2). In alternative embodiments, maintenance device 304 performs any maintenance operation that enables reconfigurable apparatus 300 to function as described herein. For example, in some embodiments, at least one configuration of reconfigurable apparatus 300 facilitates maintenance device 304 inspecting and/or repairing a surface of turbine assembly 100 or aircraft engine 154. In further embodiments, a feature of reconfigurable apparatus 300 facilitates reconfigurable apparatus 300 maintaining a position of maintenance device 304 while maintenance device 304 repairs and/or inspects turbine assembly 100 (shown in FIG. 1) or aircraft engine 154 (shown in FIG. 2). In the exemplary embodiment, reconfigurable apparatus 300 includes an anchoring feature 320, such as a leaf spring, spring-loaded arm or a magnet, configured to anchor reconfigurable apparatus 300 in position inside the cavity of the assembly.

Moreover, in the exemplary embodiment, maintenance device 304 does not necessarily operate while reconfigurable apparatus 300 is in the first configuration. For example, power source 318 is decoupled from camera 312, illuminator 314, and communication component 316 when reconfigurable apparatus 300 is in the first configuration. As a result, the first configuration of reconfigurable apparatus 300 is not limited to dimensions that allow power source 318 to couple to camera 312, illuminator 314, and communication component 316. Accordingly, first portion 306 and second portion 308 are each smaller than the cumulative size of power source 318, camera 312, illuminator 314, and communication component 316. In alternative embodiments, power source 318, camera 312, illuminator 314, and communication component 316 are coupled together in any manner that enables reconfigurable apparatus 300 to operate as described herein. For example, in some embodiments, a mechanical tether, a signal line, and/or a power line, extends between first portion 306 and second portion 308 to couple power source 318, camera 312, illuminator 314, and/or communication component 316 when reconfigurable apparatus 300 is in the second configuration. In further embodiments, maintenance device 304 operates in any configuration of reconfigurable apparatus 300.

In reference to FIGS. 1, 2 and 4, a method of maintaining turbine assembly 100 or aircraft engine 154 using reconfigurable apparatus 300 includes providing body 302 configured to move within the primary cavity of turbine assembly 100 and/or aircraft engine 154. Body 302 is adjustable between a first configuration and a second configuration. The method also includes moving body 302 into the primary cavity through access port 158 while body 302 is in the first configuration. Body 302 is changed from the first configuration to the second configuration while body 302 is within the primary cavity. The method further includes operating maintenance device 304 while body 302 is in the second configuration. In some embodiments, the method includes changing body 302 from the second configuration to the first configuration and moving body 302 out of the primary cavity while body 302 is in the first configuration.

The above described embodiments provide reconfigurable apparatus for performing maintenance operations within cavities. As used herein, the terms "maintain" and "maintenance" include any inspection and repair operations that facilitate operation of an assembly. The reconfigurable apparatus is configured to fit within and move through a cavity. The reconfigurable apparatus includes at least one maintenance device that facilitates repairing and/or inspecting the interior surfaces of the cavity. In addition, the reconfigurable apparatus changes between a first configuration and a second configuration. The first configuration facilitates the reconfigurable apparatus moving through an opening and into the cavity. The second configuration facilities operation of the at least one maintenance device. As a result, the reconfigurable apparatus enables maintenance operations in difficult to access locations within the cavity to be performed in situ.

Although the above examples were related to rotary machines, and more specifically to land-based and aircraft turbine engines, it should be understood that the articles and methods described apply more broadly to a range of assemblies having difficult-to access interior cavities that require periodic maintenance. An exemplary technical effect of the methods, systems, and apparatus described herein includes at least one of: (a) reducing the time to maintain components within cavities; (b) increasing the accessibility of difficult-to-reach locations within a cavity for inspection and/or in situ repair; (c) reducing the time that the vessel is out of service for maintenance; (d) reducing unplanned service outages for a vessel; (e) enabling the extension of planned service outages of a vessel; and (f) enhancing the quality and quantity of data captured for use in quantifying and/or modeling the service condition of at least some components of the vessel.

Exemplary embodiments of methods, systems, and apparatus for maintaining components are not limited to the specific embodiments described herein, but rather, components of systems and/or steps of the methods may be utilized independently and separately from other components and/or steps described herein. For example, the methods, systems, and apparatus may also be used in combination with other systems requiring maintenance of components, and are not limited to practice with only the systems and methods described herein. Rather, the exemplary embodiment can be implemented and utilized in connection with many other applications, equipment, and systems that may benefit from using a reconfigurable apparatus for maintenance.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A reconfigurable maintenance apparatus, said reconfigurable maintenance apparatus comprising:
   a body configured to operate within a cavity, said body having a first shape in a first configuration and a second shape in a second configuration, wherein said body comprises a first portion and a second portion, wherein the first configuration facilitates said body entering the cavity, wherein said first portion moves relative to said second portion when said body changes between the first configuration and the second configuration, and wherein said first portion is decoupled from said second portion when said body is in said first configuration, and wherein said body is positionable entirely within the cavity in the second configuration and is configured to travel freely through the cavity relative to an interior surface that defines the cavity; and
   at least one maintenance device operably coupled to said body, wherein the second configuration facilitates said at least one maintenance device performing a maintenance operation.

2. The reconfigurable maintenance apparatus in accordance with claim 1, wherein said body is configured to change shape.

3. The reconfigurable maintenance apparatus in accordance with claim 2, wherein said body includes a flexible sidewall that facilitates said body changing shape, wherein said flexible sidewall comprises a pliable membrane.

4. The reconfigurable maintenance apparatus in accordance with claim 2, wherein said body includes a sidewall, said sidewall including a plurality of segments and a plurality of hinges to facilitate said body changing shape.

5. The reconfigurable maintenance apparatus in accordance with claim 1 further comprising a communication component configured to communicate with a controller positioned remotely from the reconfigurable maintenance apparatus.

6. The reconfigurable maintenance apparatus in accordance with claim 5, wherein the communication component includes a wireless transceiver.

7. The reconfigurable maintenance apparatus in accordance with claim 1, wherein said first portion is operably coupled to said second portion when said body is in the second configuration.

8. The reconfigurable maintenance apparatus in accordance with claim 1, wherein the first shape is generally prolate.

9. The reconfigurable maintenance apparatus in accordance with claim 1, wherein the second shape is generally oblate.

10. The reconfigurable maintenance apparatus in accordance with claim 1, wherein said at least one maintenance device includes at least one of the following: a repair tool and an inspection tool.

11. The reconfigurable maintenance apparatus in accordance with claim 1, wherein the cavity is a cavity of a turbine assembly, said body configured to move through the turbine assembly.

12. The reconfigurable maintenance apparatus in accordance with claim 1, wherein said body is configured to change shape and said reconfigurable maintenance apparatus is at least partially propelled through the cavity when said body changes shape.

13. The reconfigurable maintenance apparatus in accordance with claim 1 further comprising a coupling mechanism for selectively coupling said first portion to said second portion, wherein said coupling mechanism comprises magnets.

14. The reconfigurable maintenance apparatus in accordance with claim 1 further comprising a coupling mechanism for selectively coupling said first portion to said second portion, wherein said coupling mechanism comprises at least one of a clamp, a screw, a cord, an adhesive, a suction port, a hook, an anchor, a fastener, a latch, a catch, and a hinge.

15. The reconfigurable maintenance apparatus in accordance with claim 1, wherein said reconfigurable maintenance apparatus is operational when said body is in said second configuration.

16. The reconfigurable maintenance apparatus in accordance with claim 1 further comprising a power source disposed within said second portion that provides power to said reconfigurable maintenance apparatus when said first portion is coupled to said second portion in said second configuration.

17. The reconfigurable maintenance apparatus in accordance with claim 1, wherein said reconfigurable maintenance apparatus is not operational when said body is in said first configuration.

18. The reconfigurable maintenance apparatus in accordance with claim 1 further comprising an anchoring feature for anchoring said reconfigurable maintenance apparatus within the cavity, wherein said anchoring feature comprises at least one of a leaf spring, a spring-loaded arm, and a magnet.

19. The reconfigurable maintenance apparatus in accordance with claim 1, further comprising:
   a coupling mechanism for selectively coupling said first portion to said second portion;
   a power source disposed within said second portion that provides power to said reconfigurable maintenance apparatus when said first portion is coupled to said second portion in said second configuration;
   an anchoring feature for anchoring said reconfigurable maintenance apparatus within the cavity; and a communication component configured to communicate with a controller positioned remotely from the reconfigurable maintenance apparatus;

wherein said body further includes a sidewall, said sidewall including a plurality of segments and a plurality of hinges to facilitate said body changing shape;

wherein said at least one maintenance device includes at least one of the following: a repair tool and an inspection tool; and wherein said body is configured to change shape and said reconfigurable maintenance apparatus is at least partially propelled through the cavity when said body changes shape.

20. A maintenance system comprising:
a reconfigurable apparatus comprising:
  a body configured to operate within a cavity, said body having a first shape in a first configuration and a second shape in a second configuration, wherein said body comprises a first portion and a second portion, wherein the first configuration facilitates said body entering the cavity, wherein said first portion moves relative to said second portion when said body changes between the first configuration and the second configuration, and wherein said first portion is decoupled from said second portion when said body is in said first configuration, and wherein said body is positionable entirely within the cavity in the second configuration and is configured to travel freely through the cavity relative to an interior surface that defines the cavity; and
  at least one maintenance device operably coupled to said body, wherein the second configuration facilitates said at least one maintenance device performing a maintenance operation; and
a controller positioned remotely from said reconfigurable apparatus.

21. The maintenance system in accordance with claim 20, wherein said first portion is coupled to said second portion when said body is in the second configuration.

22. The maintenance system in accordance with claim 20, wherein the reconfigurable apparatus further comprises a communication component configured to communicate with the controller.

23. The maintenance system in accordance with claim 20, wherein the cavity is a cavity of a turbine assembly, said body configured to move through the turbine assembly.

24. The maintenance system in accordance with claim 20 further comprising a positioning device configured to hold said reconfigurable apparatus and extend into the cavity.

* * * * *